US006719946B2

(12) United States Patent
Yuh et al.

(10) Patent No.: US 6,719,946 B2
(45) Date of Patent: Apr. 13, 2004

(54) ANODE SUPPORT FOR CARBONATE FUEL CELLS

(75) Inventors: Chao-yi Yuh, New Milford, CT (US); Jian Li, Alberta (CA)

(73) Assignee: FuelCell Energy, Inc., Danbury, CT (US)

( * ) Notice: Subject to any disclaimer, the term of this patent is extended or adjusted under 35 U.S.C. 154(b) by 0 days.

(21) Appl. No.: 10/028,599

(22) Filed: Dec. 20, 2001

(65) Prior Publication Data

US 2003/0118466 A1 Jun. 26, 2003

(51) Int. Cl.[7] ................. B22F 3/10; B22F 7/04
(52) U.S. Cl. .............. 419/2; 419/5; 419/9; 419/58
(58) Field of Search .............. 419/5, 9, 2, 58; 425/78

(56) References Cited

U.S. PATENT DOCUMENTS

| | | | | | |
|---|---|---|---|---|---|
| 3,943,006 | A | * | 3/1976 | Baker et al. | 136/120 FC |
| 4,200,515 | A | * | 4/1980 | Hall et al. | 204/290 R |
| 4,315,777 | A | * | 2/1982 | Nadkarni et al. | 75/232 |
| 4,384,928 | A | * | 5/1983 | Hall | 204/38 B |
| 4,659,379 | A | * | 4/1987 | Singh et al. | 75/234 |
| 4,714,586 | A | | 12/1987 | Swarr et al. | |
| 4,999,155 | A | | 3/1991 | Ong et al. | |
| 5,558,948 | A | | 9/1996 | Doyon | |

* cited by examiner

Primary Examiner—Daniel Jenkins
(74) Attorney, Agent, or Firm—Robin, Blecker & Daley

(57) ABSTRACT

An anode support formed of a three-dimensional interconnected porous nickel plaque fabricated by sintering a bed of pure metallic nickel powder particles.

21 Claims, 5 Drawing Sheets

ANODE SUPPORT FOR CARBONATE FUEL CELLS

BACKGROUND OF THE INVENTION

This invention relates to fuel cell components and fabrication methods and, in particular, to supports for fuel cell anode electrodes and methods of making same.

FIG. 1 shows schematically a fuel cell assembly 1 of a molten carbonate fuel cell with direct internal gas reforming. As shown, an anode electrode 2 and a cathode electrode 3 are in direct contact with the an electrolyte matrix or tile 4. An anode support 5 abuts the anode electrode 2 and is followed by a corrugated anode current collector 6 which, in turn, is followed by a bipolar plate 7. Reforming catalyst 11 is housed in the anode-side fuel flow compartment or spaces defined between the anode current collector 6 and the bipolar plate 7.

On the cathode side, a cathode current collector 8 follows the cathode electrode 3. The current collector 8 is followed by a bipolar plate 9.

In the current state-of-the-art, anode electrode 2 is comprised of a porous, high surface area Ni alloy (see, for example U.S. Pat. No. 4,999,155), such as Ni—Al (see, for example U.S. Pat. No. 4,659,379) or Ni—Cr (see, for example U.S. Pat. No. 4,714,586), with Al and Cr as stabilizing agents to enhance high-temperature mechanical strength and prevent excessive anode sintering at cell temperatures of 500 to 700° C. The anode 2 is partially filled with liquid electrolyte, and provides a catalytic surface for the three-phase (gas-electrolyte-electrode) reactions. Additionally, the anode is a thin layer (~10 mils) of particle assembly with a porosity near 50%, fabricated by tape casting.

In U.S. Pat. No. 5,558,948, a baseline anode fabrication method is disclosed with the objectives of in-situ anode electrode sintering and oxidizing, and in-situ electrolyte filling of the sintered and oxidized component. The patent also describes the anode support member 5 being formed from a metallic plate having a plurality of through openings for gas diffusion into the associated supported anode electrode 2.

As described in the '948 patent, when assembled into the cell assembly 1, the anode electrode 2 is a green tape composed of metal powders and organic binders. During fuel cell conditioning, the binders and additives are usually removed below 400° C., and the anode electrode powder bed itself virtually has no strength before in-situ sintering. The sintering usually only occurs at above 500° C., strengthening the anode structure.

The above initial fragile condition of the anode electrode 2 necessitates the use of the anode support member 5 to provide and maintain the integrity of the porous anode structure prior to sintering. Furthermore, during long-term fuel cell operation, the anode electrode may deform under concentrated compressive forces carried to the electrode through the corrugated anode current collector 6. The anode support member 5 helps to redistribute and even out the compressive forces. In order to function as a support, the member 5 must have sufficient long-term creep strength and stiffness at fuel cell operation temperature.

One of the well-known catalyst decay mechanisms in a fuel cell is the electrolyte intrusion in each cell assembly 1 from the anode electrode 2. During the operation of the fuel cell, each anode electrode 2 is filled (5–50% of its void volume) with electrolyte. Thermodynamically, this electrolyte tends to wet the associated anode support 5 and the anode current collector 6, reaching the reforming catalyst 11. Once sufficient electrolyte reaches the catalyst 11, the catalyst is poisoned, and is no longer able to perform the hydrocarbon catalytic reforming function to generate sufficient hydrogen fuel for the anode reaction. Therefore, in addition to the role of providing strength and stiffness to the anode, the anode support component 5 also functions as an electrolyte creepage barrier, retarding electrolyte creepage from the electrolyte filled anode electrode 2 to the reforming catalyst 11.

In order to perform the barrier function, the openings in the support member 5 should be much larger than the pore size of the anode electrode 2 (for a slower capillary electrolyte transfer) with sufficient thickness (for a longer electrolyte travelling distance). The material of the support member should also be non-wettable to molten electrolyte (i.e., high contact angle) to reduce electrolyte creepage rate. The support also should allow gas access to the anode electrode 2 for the fuel cell reaction. Therefore, the geometry and pattern of the anode support needs to be designed to allow such gas access.

Conventionally, the anode support member 5 may be a perforated Ni plate as disclosed in the '948 patent (available from Harrington & King and from Ferguson Perforating & Wire). Other conventional forms for the member 5 are expanded Ni mesh (available from Exmet Corporation) and Ni wire mesh (available from Unique Wire Weaving of Hillside, Cleveland Wire Cloth, and Gerard Daniel Worldwide). These forms of the member exhibit low wettability of the electrolyte on the Ni surface.

Use of a perforated Ni plate for the anode support member 2 has certain disadvantages. One disadvantage is the limited manufacturing capability available for forming a thin sheet metal plate with small openings of the size required for the support 5. A second disadvantage is the shadow (blockage) effect caused by the plate for gas diffusion (gas availability to the anode electrode at the non-perforated region). A final disadvantage is the high cost of the plate.

For the mesh type anode support (expanded or wire), the need to partially embed the support into the anode electrode causes a non-uniform thickness of the anode assembly. This results in a non-uniform contact with the anode current collector which, in turn, adversely affects the performance and life of the fuel cell assembly. In addition, the mesh support is also expensive.

It is therefore an object of the present invention to provide a method for fabricating an anode support and a resultant anode support which do not suffer from the above disadvantages.

It is a further object of the present invention to provide a method of fabricating an anode support and an anode support which lend themselves to easier implementation and are less costly.

It is still a further object of the present invention to provide a method of fabricating an anode support and an anode support which promote gas diffusion to the anode electrode and uniform contact with the anode current collector.

SUMMARY OF THE INVENTION

In accordance with the principles of the present invention, the above and other objectives are realized in a method for fabricating an anode support in which metallic nickel powder of a predetermined particle size is formed into a powder bed and the powder bed heated at a temperature to cause sintering of the particles. This results in an interconnected sintered nickel porous plaque suitable for use as an anode support.

Preferably, the particle size of the nickel powder is in a range of 45 µm to 100 µm. Also, preferably, the sintering temperature is in a range of 1000° C. to 1100° C. and the sintering time is in a range of 30 to 120 minutes. Additionally, the resultant porous plaque preferably has a thickness in the range of 250 µm to 400 µm and a porosity of 50% to 65%.

In the embodiment to be disclosed hereinafter, the heating for sintering also is in a protective atmosphere of $H_2$—$N_2$. Also disclosed is an anode assembly formed from the anode support and an anode electrode.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
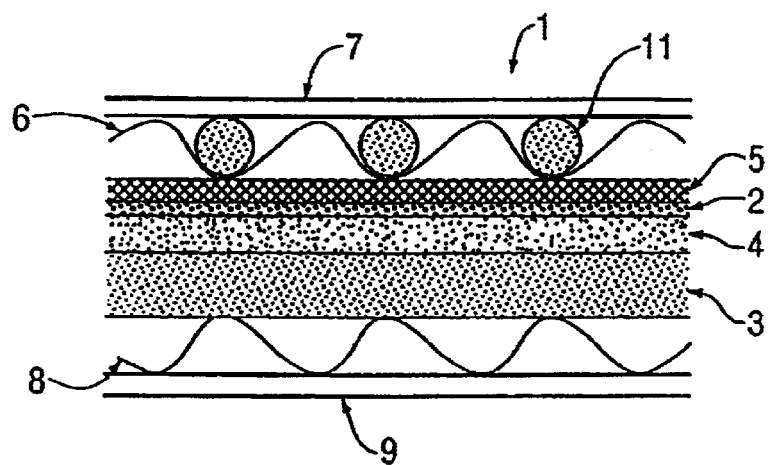
FIG. 1 shows a conventional fuel cell assembly for a molten carbonate fuel cell which utilizes an anode support.
Figure 2:
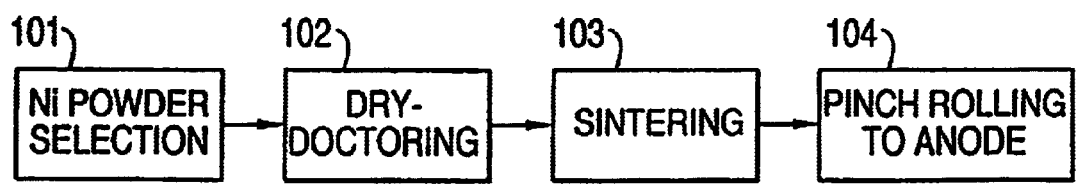
FIG. 2 shows a flow diagram of a method for fabricating an anode support in accordance with the principles of the present.
Figure 3:
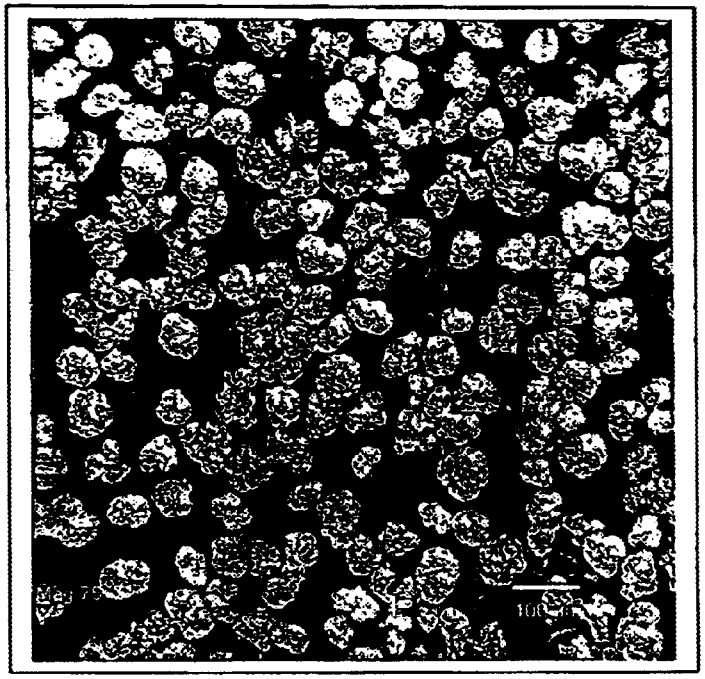
FIG. 3 shows the morphology of a representative nickel particle utilized to fabricate an anode support using the method of FIG. 2.

FIG. 2 illustrates a flow diagram of a method of fabricating an anode support in accordance with the principles of the present invention. As shown, in step 101 the material to be used to fabricate the anode support is selected. In accordance with the principles of the present, a pure metallic nickel (Ni) powder having a pre-determined particle size is selected as the support fabrication material. In order to produce a support having significant large pores in the sintered state for sufficient reactant permeability and low mechanical creep, the particle size of the powder is chosen in the range of 45 µm to 100 µm FIG. 3 shows the morphology of a representative one of the Ni particles usable for the anode support of the invention. Pure metallic Ni powder of this type is available from Praxair and is sold as Ni118.

The next step in the anode support fabrication process is to form the Ni particles into a thin sheet powder bed of preselected thickness. In the method of FIG. 2, the Ni powder particles are uniformly spread onto a flat substrate in a dry doctoring step 102. The thickness of the spread powder bed is selected or determined based on the desired final thickness of the anode support. For a support thickness of 15.0 mils, a typical bed thickness might be 16.0 mils. In the case illustrated, graphite is used as the substrate material for the bed. However, other substrate materials, such as for example, cordierite or aluminosilicate, might be employed.

The next step in the process is step 103 in which the powdered bed is sintered. Typically, sintering is carried out in a protective atmosphere. A usable atmosphere is 4%$H_2$—$N_2$. Moreover, the sintering temperature and time are dependent on a number of factors. These factors include powder size and packing density. Preferable sintering temperatures are temperatures in the range of 1000° C. to 1100° C. and preferable sintering times are times in the range of from 30 to 120 minutes. These sintering temperatures and times can be used to produce sintered structures of a final sintered thickness in the range of 250 µm to 400 µm.

The sintering process results in a three-dimensional interconnected porous Ni plaque forming a completed anode support. The porosity of the plaque is desirably in the range of 50% to 65%. This range is desired for allowing the reactant gases to diffuse through the support to the supported anode electrode for the electrochemical reaction.

Figure 4:
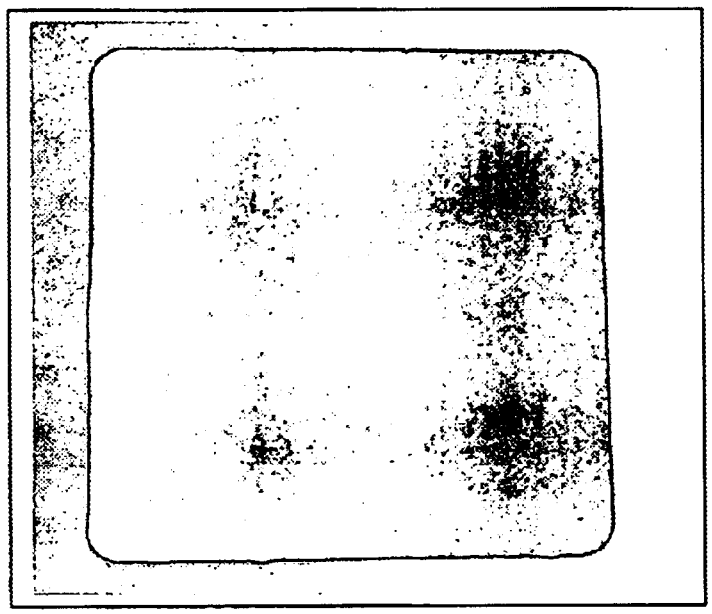
FIG. 4 shows an anode support fabricated using the method of FIG. 2.
Figure 5:
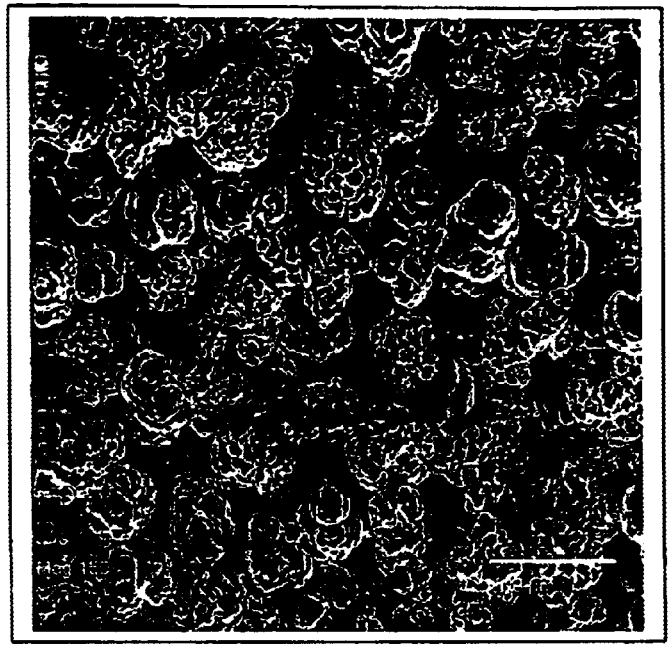
FIG. 5 shows a micrograph of the flat surface of the anode support of FIG. 4.
Figure 6:
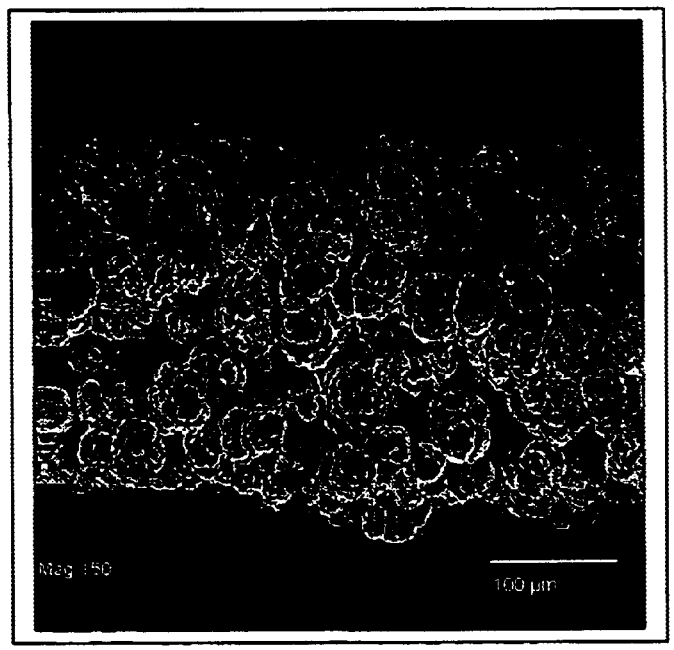
FIG. 6 shows a micrograph of the cross-section of the anode support of FIG. 4.

FIG. 4 is an illustration of anode support fabricated with the method of the invention. FIGS. 5 and 6 show micrographs of the surface and cross-section of the support of FIG. 4.

In order to evaluate the creep strength of the sintered anode support fabricated with the method of the invention shown in FIG. 2, a compression test with a pressure of 50 psi, typical for a carbonate fuel cell stack, for 100 hours at the designed carbonate operation temperature 650° C. was conducted. In this test, the thickness change of the compressed sample was found to be immeasurable. Furthermore, a simulated creepage test was conducted, in order to evaluate the electrolyte creepage crossing the anode support from the filled anode support. This test verified the support as being a successful electrolyte transport barrier.

In order to utilize the anode support resulting from the fabrication process of FIG. 2, with an anode electrode, a further step is carried out, illustrated in FIG. 2 as step 104, in which the sintered anode support is pinch-rolled together with an anode electrode to laminate the support and electrode together. The anode electrode can be formed using a tape-casting method as described in the above-discussed '948 patent, the teachings of which are incorporated herein by reference. During the pinch rolling process, since the anode is virtually incompressible, only the sintered anode support thickness decreases under the rolling pressure. Usually, it is desirable to control the anode/support assembly thickness to be in the range of 400 µm to 500 µm.

Figure 7:
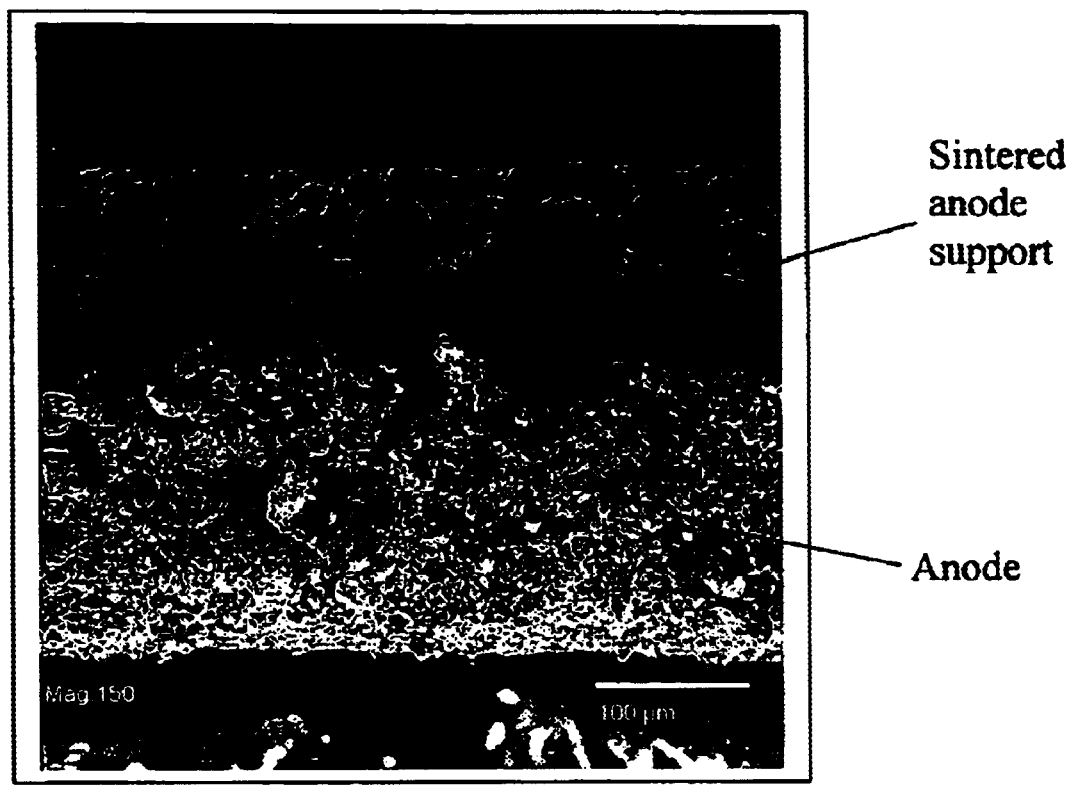
FIG. 7 illustrates a micrograph of the cross-section of the anode support of FIG. 4 laminated to an anode electrode.

FIG. 7 is a micrograph of a cross-section of a resultant anode assembly. As can be seen from this figure, the anode and the sintered anode support are bound tightly together as a result of the pinch rolling process.

Figure 8:
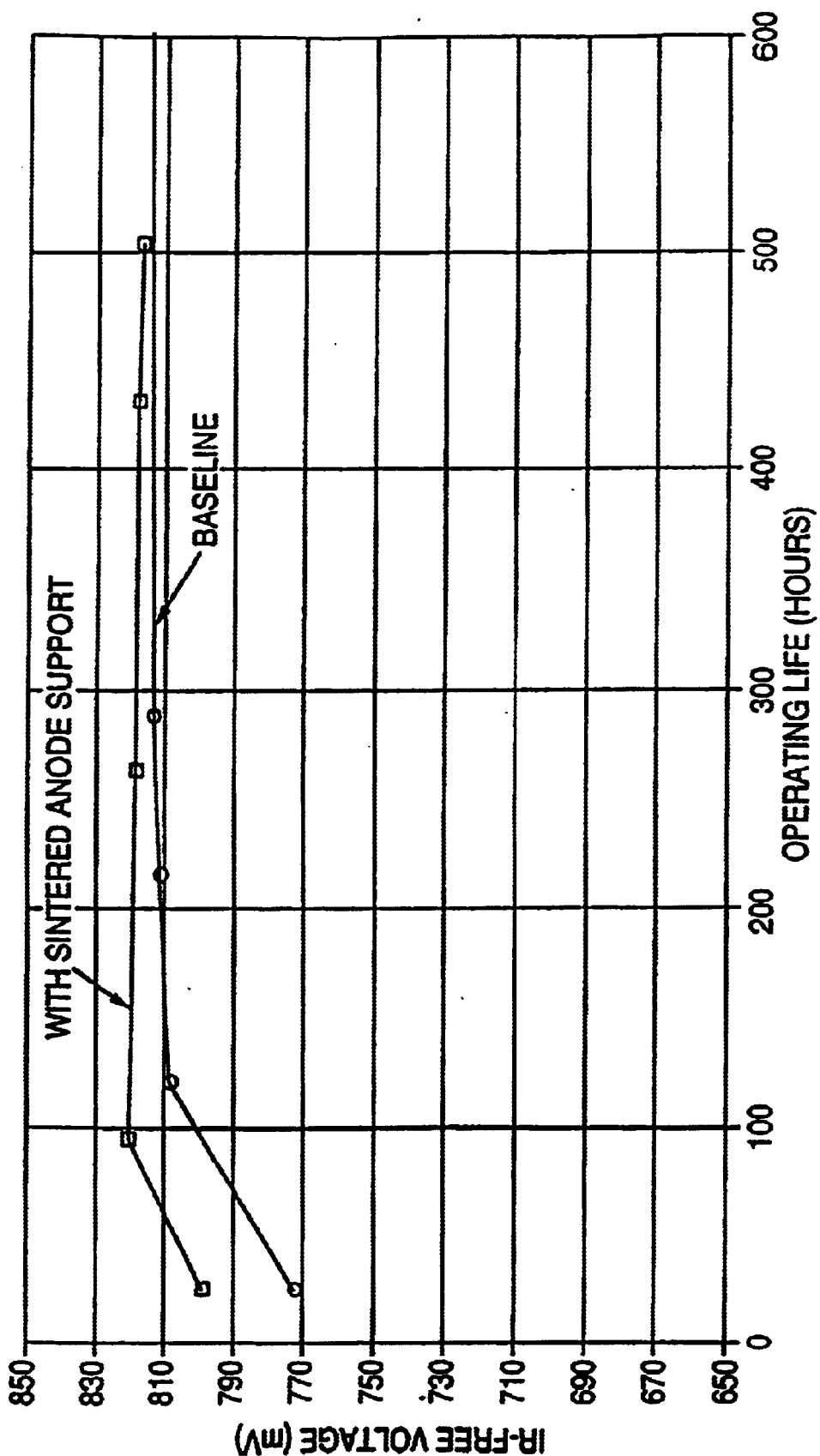
FIG. 8 is a plot of the IR-Free voltage versus operating life of a single fuel cell assembly utilizing the anode support of FIG. 4.

A 7"×7" single fuel cell assembly test was conducted to evaluate the performance of such a fabricated anode assembly. FIG. 8 shows the IR-free voltage versus operating life with 75% fuel utilization, in comparison with that of a baseline single cell in which a mesh-type anode support was used. The cell with the sintered anode support of the invention performs as well as the cell with the baseline anode support, demonstrating the efficacy of the anode support and the method of the invention.

A simple and less costly anode fabrication method and resultant anode support have been disclosed. The resultant anode support is found to perform the required functions of mechanically supporting the anode electrode and retarding electrolyte creepage. The anode support is also gas permeable, has sufficient mechanical strength and thickness, does not transport significant electrolyte to the direct internal reforming catalyst, and is able to be formed so as to result in substantially uniform thickness of the anode assembly (anode and anode support).

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A method comprising:
    fabricating an anode support for supporting an anode electrode of a fuel cell including: providing a metallic nickel powder of predetermined particle size; arranging the powder in a bed; and sintering the bed of powder to produce a three-dimensional interconnected porous nickel plaque forming an anode support.

2. A method in accordance with claim 1, wherein:
    said particle size is in the range of 45 $\mu$m to 100 $\mu$m.

3. A method in accordance with claim 1, wherein:
    said plaque has a thickness in the range of 250 $\mu$m to 400 $\mu$m.

4. A method in accordance with claim 1, wherein:
    said plaque has a porosity in the range of 50% to 65%.

5. A method in accordance with claim 1, wherein:
    said step of sintering is carried out at a temperature in the range of 1000° to 1100° C. for a period of time in the range of 30 to 120 minutes.

6. A method in accordance with claim 5, wherein:
    said step of sintering is carried out in a $H_2$—$N_2$ atmosphere.

7. A method in accordance with claim 6, wherein:
    said step of sintering is carried out in a 4% $H_2$—$N_2$ atmosphere.

8. A method in accordance with claim 5, wherein:
    said step of arranging is carried out by dry doctoring said powder onto a substrate.

9. A method in accordance with claim 8, wherein:
    said dry doctoring is such that said powder is spread uniformly onto said substrate.

10. A method in accordance with claim 9, wherein:
    said substrate comprises graphite.

11. A method in accordance with claim 1, further comprising:
    joining said anode support to an anode electrode to form an anode assembly.

12. A method in accordance with claim 11, wherein:
    said anode assembly has a thickness in the range of 400 $\mu$m to 500 $\mu$m.

13. A method in accordance with claim 11, further comprising:
    assembling said anode assembly with other components to form a fuel cell assembly.

14. A method in accordance with claim 13 wherein;
    said fuel cell assembly is a molten carbonate fuel cell assembly.

15. Apparatus comprising:
    an anode support formed as a three-dimensional porous plaque of sintered nickel powder.

16. Apparatus in accordance with claim 15, wherein:
    said plaque has a thickness in the range of 250 $\mu$m to 400 $\mu$m.

17. Apparatus in accordance with claim 15, wherein:
    said plaque has a porosity in the range of 50% to 65%.

18. Apparatus in accordance with claim 15, further comprising:
    an anode electrode joined to said anode support to form an anode assembly.

19. Apparatus in accordance with claim 18, wherein:
    said anode assembly has a thickness in a range of 400 $\mu$m to 500 $\mu$m.

20. Apparatus in accordance with claim 18, further comprising:
    a cathode electrode;
    an electrolyte tile;
    and wherein said anode assembly, cathode electrode and said electrolyte tile are assembled to form a fuel cell assembly.

21. Apparatus in accordance with claim 20, wherein said electrolyte is a carbonate electrolyte.

* * * * *

UNITED STATES PATENT AND TRADEMARK OFFICE
CERTIFICATE OF CORRECTION

PATENT NO. : 6,719,946 B2  Page 1 of 1
DATED : April 13, 2004
INVENTOR(S) : Chao-Yi Yuh et al.

It is certified that error appears in the above-identified patent and that said Letters Patent is hereby corrected as shown below:

Column 1,
Line 3, insert -- STATEMENT AS TO RIGHTS TO INVENTIONS MADE UNDER FEDERALLY SPONSORED RESEARCH AND DEVELOPMENT
This invention was made with Government support under contract DE-FC21-95MC31184 awarded by the Department of Energy. The Government has certain rights in the invention. --.

Signed and Sealed this

Twenty-third Day of May, 2006

JON W. DUDAS
*Director of the United States Patent and Trademark Office*